United States Patent
Sahner et al.

(10) Patent No.: US 9,991,565 B2
(45) Date of Patent: Jun. 5, 2018

(54) SAFETY SENSOR SYSTEM FOR AN ELECTROCHEMICAL STORAGE SYSTEM

(71) Applicant: Robert Bosch GmbH, Stuttgart (DE)

(72) Inventors: Kathy Sahner, Mannheim (DE); Jens Grimminger, Leonberg (DE); Marcus Wegner, Leonberg (DE); Dirk Liemersdorf, Sachsenheim (DE)

(73) Assignee: Robert Bosch GmbH, Stuttgart (DE)

(*) Notice: Subject to any disclaimer, the term of this patent is extended or adjusted under 35 U.S.C. 154(b) by 233 days.

(21) Appl. No.: 14/394,032

(22) PCT Filed: Mar. 5, 2013

(86) PCT No.: PCT/EP2013/054414
§ 371 (c)(1),
(2) Date: Oct. 10, 2014

(87) PCT Pub. No.: WO2013/152896
PCT Pub. Date: Oct. 17, 2013

(65) Prior Publication Data
US 2015/0132620 A1 May 14, 2015

(30) Foreign Application Priority Data
Apr. 12, 2012 (DE) .......... 10 2012 205 929

(51) Int. Cl.
*H01M 10/052* (2010.01)
*H01M 10/42* (2006.01)
(Continued)

(52) U.S. Cl.
CPC ......... *H01M 10/4228* (2013.01); *G01M 3/16* (2013.01); *H01M 10/052* (2013.01);
(Continued)

(58) Field of Classification Search
CPC ..... H01M 10/4228; H01M 10/48; G01M 3/16
(Continued)

(56) References Cited

U.S. PATENT DOCUMENTS

| 5,405,583 A | 4/1995 | Goswami et al. |
| 5,527,446 A * | 6/1996 | Kosek ............... G01N 27/4074 204/412 |

(Continued)

FOREIGN PATENT DOCUMENTS

| CN | 1187052 A | 7/1998 |
| DE | 19835769 A1 | 2/2000 |

(Continued)

OTHER PUBLICATIONS

Brinz, T., Machine translation of WO 03/034048 A1, Apr. 2003.*

*Primary Examiner* — Sean P Cullen
(74) *Attorney, Agent, or Firm* — Norton Rose Fulbright US LLP; Gerard Messina

(57) ABSTRACT

A sensor system for detecting a leak of a system component from an electrochemical storage system, in particular a lithium-ion battery. To determine a defect in the electrochemical storage system, the sensor system includes a reaction chamber containing a detection component, and a measuring device for determining a physical variable within the reaction chamber. The value of the physical variable is changeable by a chemical reaction of the system component with the detection component, so that a leak of the system component is detectable via a change in the value of the physical variable. Also described is a sensor element for such a sensor system, an electrochemical storage system having such a sensor system or sensor element, the use of such a sensor system or sensor element, and a mobile or stationary system, for example an electric vehicle, equipped with the sensor system, the sensor element, or the storage system.

33 Claims, 2 Drawing Sheets

(51) Int. Cl.
  *H01M 10/48* (2006.01)
  *G01M 3/16* (2006.01)
(52) U.S. Cl.
  CPC ....... *H01M 10/4285* (2013.01); *H01M 10/48* (2013.01); *H01M 2200/00* (2013.01); *Y02E 60/122* (2013.01); *Y02T 10/7011* (2013.01)
(58) Field of Classification Search
  USPC .............................................. 429/90; 73/23.2
  See application file for complete search history.

(56) References Cited

U.S. PATENT DOCUMENTS 6,106,969 A * 8/2000 Lian .................... H01M 10/488
                                                        429/90
2007/0229294 A1* 10/2007 Vossmeyer ........ H01M 10/4207
                                                        340/636.19
2007/0275296 A1* 11/2007 Ueda .................... H01M 10/48
                                                        429/61
2012/0121942 A1* 5/2012 Kim .................... H01M 2/0426
                                                        429/7

FOREIGN PATENT DOCUMENTS

| | | |
|---|---|---|
| DE | 19905776 A1 | 8/2000 |
| DE | 10 2005 006303 | 8/2006 |
| EP | 1 675 210 | 6/2006 |
| GB | 2132348 A | 7/1984 |
| JP | H10 199547 | 7/1998 |
| JP | 2005 293881 | 10/2005 |
| WO | 0135057 A2 | 5/2001 |
| WO | WO 03034048 A1 * | 4/2003 ........... G01N 21/783 |
| WO | 2011/072989 | 6/2011 |

* cited by examiner

SAFETY SENSOR SYSTEM FOR AN ELECTROCHEMICAL STORAGE SYSTEM

FIELD OF THE INVENTION

The present invention relates to a sensor system for an electrochemical storage system, a corresponding sensor element, an electrochemical storage system equipped with such a sensor system or sensor element, the use of such a sensor system or sensor element, and a mobile or stationary system equipped with the sensor system, the sensor element, or the storage system.

BACKGROUND INFORMATION

The importance of lithium-ion batteries as electrochemical energy stores has increased greatly in recent years. In addition to use in portable devices such as laptops or mobile telephones, attention is also focused in particular on use in electric vehicles (EV). Depending on the configuration of the electric vehicles as a hybrid electric vehicle, a plug-in hybrid electric vehicle, or an electric vehicle without a supplemental internal combustion engine, the capacity of present battery systems reaches values of approximately 1 kAh to 10 kAh. This corresponds to a stored energy of approximately 3 kWh to 40 kWh.

Reports of uncontrolled overheating, fire, or explosion of laptop batteries indicate the possible risks which may result from lithium-ion batteries in the case of damage to the entire battery system.

The publication DE 10 2005 006 303 A1 discusses a method and a device for monitoring the gassing voltage of accumulators.

SUMMARY OF THE INVENTION

The subject matter of the present invention relates to a sensor system for detecting a leak of a system component from an electrochemical storage system, in particular a battery, for example a lithium-ion battery. The system component may in particular be a cell component or an integral cell component of a galvanic cell of a battery, in particular a lithium-ion battery.

According to the present invention, the sensor system includes a reaction chamber which contains a detection component, and a measuring device for determining a physical variable within the reaction chamber. The value of the physical variable may be changed by a chemical reaction, in particular a specific chemical reaction, of the system component with the detection component. A leak of the system component is thus detectable via a change in the value of the physical variable.

The present invention is based in particular on the principle that a physical effect of a chemical reaction, such as a color change or a change in the pH, in the electrical resistance, or in the electrical conductivity, within the reaction chamber may be detected by an appropriate measurement. It is also possible, based on the measuring result, to correlate the quantity of the leaked system component, in particular the cell component. It is possible for the sensor system to integratively operate until all starting material species of the detection component which are necessary for the chemical reaction with the system/cell component are consumed.

Within the scope of the present invention, a battery may be understood to mean not only a primary battery, but in particular also a secondary battery (accumulator). A battery may be understood in particular to mean a battery which includes one or multiple galvanic cells. In the battery, multiple galvanic cells may be combined to form a so-called battery module, and multiple battery modules may optionally be combined to form a so-called battery pack.

Safety-critical damage events in batteries are usually manifested by an escape of cell components, and may be caused, for example, by leaks, such as from (hairline) cracks, in cell housings, or as the result of the opening of cell housings due to internal excess pressure, with bursting of a predetermined breaking point, for example. A cell having electrolyte loss due to a hairline crack ages, for example, more quickly than a cell with an intact cell housing, since its internal resistance increases more sharply. This may result in a greater temperature stress on the damaged cell. If this is not noticed in time, there is the risk of damage to the entire battery.

The advantage of a sensor system according to the present invention lies in early recognition of these types of damage events. This in turn advantageously makes it possible to increase the safety as well as the service life of the electrochemical storage system. Since due to the sensor system according to the present invention the safety of the electrochemical storage system, among other things, may be increased, the sensor system according to the present invention may also be referred to as a safety sensor system.

Due to early recognition of damage events, warning may be advantageously made, and targeted countermeasures taken, prior to these damage events. Further damage may thus advantageously be avoided, and in particular damage of the entire battery may be prevented.

The earlier a damage event is reliably detected, the more moderate in particular the countermeasures to be initiated may be. When a damage event of a cell or a module is recognized early, it is possible, for example, to prevent damage to the entire battery and thus greatly increase its overall service life as well as safety, so that a cell or a module which is recognized as defective may be replaced, for example during routine maintenance.

Another advantage of a sensor system according to the present invention lies in the redundant detection of defects, since such a sensor system may be operated independently of other systems that are present, such as the battery management system. The sensor system according to the present invention on the one hand allows recognition of defects in other devices, for example the battery management system (BMS). On the other hand, the sensor system according to the present invention makes it possible to ensure that a damage event is still recognized, even in the event of failure of such a system.

Since batteries for electric vehicles store a much higher quantity of energy than laptop batteries, for example, reliable operation and a high level of safety of the batteries are of particular interest for the widespread introduction of electric vehicles. To achieve this, it is particularly advantageous to use the sensor system according to the present invention in an electrochemical storage system, in particular a battery, for example a lithium-ion battery, of an electric vehicle.

A leak of the system component may be detectable, for example, via a change in conductivity, a change in the electrical resistance, a change in voltage, a change in current, a change in pH, or a color change.

In one specific embodiment, the measuring device is therefore a measuring device for determining at least one physical variable which is selected from the group composed of electrical conductivity, electrical resistance, electrical voltage, electrical current intensity, pH, wavelength, transmission, absorption, and combinations thereof.

The change in the value of the physical variable may be correlated in particular with the quantity of the leaked system component, in particular the cell component.

For evaluating the obtained data, it is possible to take into account the absolute value of the measuring curve as well as its slope. In this way, in addition to the total quantity of a leaked system component, the rate of the leak, i.e., the intensity of a leak, may be ascertained.

Thus, in another specific embodiment, a leak quantity and/or a leak rate of the system component is/are determinable in particular based on the change in the value of the physical variable. The determination of the leak quantity and/or the leak rate of the system component may be based in particular on the absolute value and/or the slope of the change in the value of the physical variable.

In batteries according to the present related art, the system component, in particular the cell component, which is the first to leak is the electrolyte.

Thus, in another specific embodiment, the system component is an integral electrolyte component, in particular of a, or the, galvanic cell(s) of the battery.

In lithium-ion cells, the electrolyte typically contains acyclic and/or cyclic esters, in particular acyclic and/or cyclic organic carbonates, i.e., carboxylic acid esters, and/or ethers, for example ethylene carbonate, propylene carbonate, dimethyl carbonate, diethyl carbonate, ethylmethyl carbonate, 1,3-dioxolane, and/or dimethoxyethane, and/or nitriles, as well as at least one conducting salt, for example lithium hexafluorophosphate and/or lithium bis(trifluoromethanesulfonyl)imide.

In one particular configuration of this specific embodiment, the system component is an acyclic or cyclic ester, in particular an acyclic or cyclic organic carbonate (carboxylic acid ester), and/or an acyclic or cyclic ether. For example, the system component may be selected from the group composed of ethylene carbonate, propylene carbonate, dimethyl carbonate, diethyl carbonate, ethylmethyl carbonate, 1,3-dioxolane, dimethoxyethane, and mixtures thereof. In particular, the system component may be an ester, in particular an organic carbonate. Esters, in particular organic carbonates, are advantageously contained in most of the common electrolytes presently used.

In another specific embodiment, the chemical reaction is an ester cleavage, such as an alkaline or acidic ester cleavage, in particular an alkaline ester cleavage, and/or an ether cleavage.

In another specific embodiment, the detection component contains basic functional groups, in particular strongly basic functional groups, or acidic functional groups. In particular, the detection component may contain quaternary ammonium groups, in particular with hydroxide ions as counterions. An alkaline ester cleavage of carbonates, for example, may be achieved using strongly basic groups such as quaternary ammonium groups, with hydroxide ions as counterions.

In another specific embodiment, the detection component includes a support structure. The basic functional groups or acidic functional groups may be bound in particular to the surface of the support structure. In other words, the support structure of the detection component may be surface-functionalized with the basic functional groups or acidic functional groups. The chemical reaction with the leaking system component, in particular the cell component, may be brought about as a result of the surface functionalization. The support structure may be made, for example, of a material which is selected from the group composed of zeolites, aluminum oxides, silica gels, synthetic resins, polysaccharides, and mixtures thereof.

In another specific embodiment, the detection component and/or the support structure of the detection component is/are porous, in particular open-pored. Good contact between the system component and the detection component may thus be advantageously achieved. Due to the porosity, in addition the surface, and thus the surface area available for the chemical reaction or the quantity of detection component provided for the chemical reaction, may advantageously be increased.

The detection component may in particular be an ion exchanger material. Materials of this type may contain basic or acidic functional groups which are bound to a support structure, and may also be porous.

In particular for a measurement of the electrical conductivity or the electrical resistance, it is meaningful to carry out the chemical reaction between the system component and the detection component in a liquid environment.

In another specific embodiment, the reaction chamber therefore also contains a liquid. In particular, the liquid may wet and/or enclose the detection component, for example in the form of a liquid or gel-like film. For example, the liquid, for example in the form of a thin film, may wet the surface of the support structure of the detection component. The liquid may in particular enclose the basic or acidic functional groups. If the detection component or its support structure is porous, the pores of the detection component or the pores of the support structure of the detection component may also contain the liquid.

The liquid may in particular be highly viscous and/or high-boiling, and/or may have a low saturation vapor pressure. The reaction chamber may advantageously be prevented from drying out by using a liquid which is highly viscous and/or high-boiling, and/or which has a low saturation vapor pressure.

A highly viscous liquid may be understood in particular to mean a liquid which has a viscosity of greater than or equal to 1 mPa·s, for example greater than or equal to $10^2$ mPa·s, at 20° C. For example, the liquid may have a viscosity of greater than or equal to 1 mPa·s to less than or equal to $10^7$ mPa·s, for example greater than or equal to $10^2$ mPa·s to less than or equal to $10^4$ mPa·s, at 20° C.

A high-boiling liquid may be understood in particular to mean a liquid which has a boiling point of greater than or equal to 200° C.

A liquid having a low saturation vapor pressure may be understood in particular to mean a liquid which has a saturation vapor pressure of less than or equal to 50 Pa, for example less than or equal to 5 Pa, at 20° C. For example, the liquid may have a saturation vapor pressure of greater than or equal to 0 Pa to less than or equal to 50 Pa, for example greater than or equal to 0.01 Pa to less than or equal to 5 Pa.

The liquid may in particular contain a solvent or a solvent mixture. The solvent or the solvent mixture may in particular be a polar solvent or a solvent mixture. For example, the liquid may contain one or multiple polyalcohols and/or one or multiple polyethers, for example polyethylene oxide.

The solvents of the liquid may be selected in such a way that they are inert with respect to the chemical reaction. For example, if the chemical reaction is an ether cleavage, the liquid may be free of ethers, and/or if the chemical reaction is an ester cleavage, the liquid may be free of esters.

In another specific embodiment, the sensor system also includes a support body, which in particular is thin, to which a layer which contains the detection component and optionally the liquid is applied. The layer containing the detection component and optionally the liquid may be used in particular as a reaction chamber. The support body may in particular be a supporting film, for example made of plastic, for example polyethylene and/or polypropylene. As a result of the support body, the sensor system according to the present invention, in particular the reaction chamber for the chemical reaction, may be installed at a suitable location in or on the electrochemical storage system, a battery pack, for example.

The layer containing the detection component and optionally the liquid may be connected to the measuring device via electrical lines. The layer containing the detection component and optionally the liquid may partially enclose the electrical lines.

In one particular configuration of this specific embodiment, the coated support body has a strip-shaped configuration, in particular as a test strip, and/or is attachable, in particular adherable, to the electrochemical storage system, in particular the battery, for example the lithium-ion battery.

In addition, the sensor system may include a warning device or be connectable to a warning device. The warning device may in particular be connected or connectable to the measuring device. The warning device may in particular be configured for outputting a warning and/or taking a safety precaution when a leak of the system component is detected, in particular if the leak quantity and/or the leak rate of the system component exceed(s) a predefined limiting value. The limiting value may be selected in such a way that the warning or safety precaution responds as early as possible, ideally at the first sign of an irregularity, and in particular well before critical overheating of the electrochemical storage system, in particular a cell, a module, or a pack, of the battery.

With regard to further technical features and advantages of the sensor system according to the present invention, explicit reference is hereby made to the discussions concerning the sensor element according to the present invention, the electrochemical storage system according to the present invention, the use according to the present invention, the mobile or stationary system according to the present invention, and to the figures and the description of the figures.

A further subject matter of the present invention relates to a sensor element for a sensor system for detecting a leak of a system component from an electrochemical storage system, in particular a battery, for example a lithium-ion battery. In particular, the sensor element according to the present invention may be configured for a sensor system according to the present invention.

According to the present invention, the sensor element includes a support body, which in particular is thin, to which a layer which contains a detection component and optionally a liquid is applied. The layer containing the detection component and optionally the liquid may be used in particular as a reaction chamber, for example of the sensor system according to the present invention.

A value of a physical variable within the layer may be changed by a chemical reaction, in particular a specific chemical reaction, of the system component with the detection component. A leak of the system component is thus detectable by determining a change in the value of the physical variable within the layer. The change in the value of the physical variable may be detected in particular by a measuring device which is connectable to the sensor element, in particular the measuring device of the sensor system according to the present invention.

As a result of the support body, the sensor system according to the present invention may be installed at a suitable location in or on the electrochemical storage system, a battery pack, for example.

The support body may in particular be a supporting film, for example made of plastic, for example polyethylene and/or polypropylene.

In one specific embodiment, the sensor element has a strip-shaped configuration, in particular as a test strip, and/or is attachable, in particular adherable, to the electrochemical storage system, in particular the battery, for example the lithium-ion battery.

In another specific embodiment, the layer containing the detection component and optionally the liquid is connectable to a/the measuring device via electrical lines. The layer containing the detection component and optionally the liquid may, in particular, partially enclose the electrical lines.

With regard to further technical features and advantages of the sensor element according to the present invention, explicit reference is hereby made to the discussions concerning the sensor system according to the present invention, the electrochemical storage system according to the present invention, the use according to the present invention, the mobile or stationary system according to the present invention, and to the figures and the description of the figures.

A further subject matter of the present invention relates to an electrochemical storage system, for example a battery, in particular a lithium-ion battery, which includes a sensor system according to the present invention or a sensor element according to the present invention.

A further subject matter of the present invention relates to the use of a sensor system according to the present invention or a sensor element according to the present invention for detecting a leak of a system component from an electrochemical storage system, in particular a battery, for example a lithium-ion battery, and/or as a safety device and/or as a system monitoring device, in particular as a device which monitors operational readiness of the system, for an electrochemical storage system, in particular a battery, for example a lithium-ion battery.

A further subject matter of the present invention relates to a mobile or stationary system which includes or uses a sensor system according to the present invention and/or a sensor element according to the present invention and/or an electrochemical storage system according to the present invention. In particular, the mobile or stationary system may be a vehicle, for example a hybrid vehicle, a plug-in hybrid vehicle, or an electric vehicle, an energy storage system, for example for stationary energy storage, for example in a residence or a technical facility, a power tool, a power gardening tool, or an electronic device, for example a notebook, a PDA, or a mobile telephone.

Due to the particularly high safety requirements in automotive applications, the sensor system according to the present invention and/or the sensor element according to the present invention and/or the electrochemical storage system according to the present invention is/are particularly suited for hybrid vehicles, plug-in hybrid vehicles, and electric vehicles (vehicles operated purely electrically).

With regard to further technical features and advantages of the electrochemical storage system according to the present invention, the use according to the present invention, and the mobile or stationary system according to the present invention, explicit reference is hereby made to the discussions concerning the sensor system according to the present invention, the sensor element according to the present invention, and to the figures and the description of the figures.

Further advantages and advantageous embodiments of the subject matter according to the present invention are illustrated in the drawings and explained in the following description. It is pointed out that the drawings are merely descriptive in nature, and are not intended to limit the present invention in any way.

DETAILED DESCRIPTION

Figure 1:
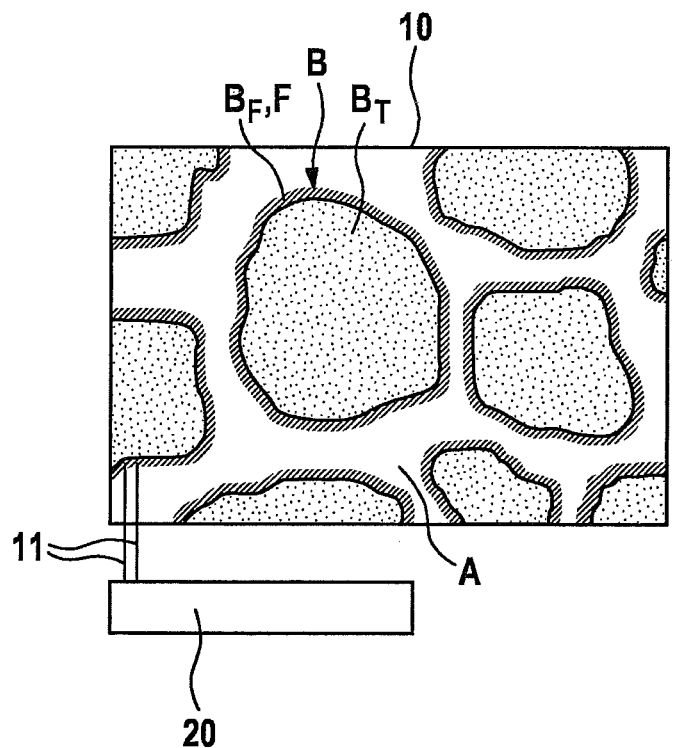
FIG. 1 shows a schematic view of one specific embodiment of a sensor system according to the present invention, having a reaction chamber and a measuring device, the reaction chamber being illustrated in greatly enlarged form.

FIG. 1 shows that the sensor system includes a reaction chamber 10 which contains a detection component B. Detection component B includes a support structure $B_T$ and basic or acidic functional groups $B_F$ (not illustrated in detail), basic or acidic functional groups $B_F$ being bound to the surface of support structure $B_T$.

Materials which may also be used as ion exchangers, such as zeolites, aluminum oxides, silica gels, synthetic resins, and polysaccharides, are suitable for detection component B. The materials may have a porous structure to allow sufficiently high gas flowthrough. In the event of a leak of a system component A, which is gaseous, for example, from an electrochemical storage system, such as a (lithium-ion) battery/cell, system component A may penetrate the pores, and in the process may take part in a chemical reaction with detection component B.

System component A may in particular be an integral electrolyte component. For example, system component A may be an acyclic or cyclic ester, in particular an acyclic or cyclic organic carbonate, and/or an acyclic or cyclic ether. A chemical reaction of such system components A, for example organic carbonates, with functional groups $B_F$ of detection component B, which may, for example, be quaternary ammonium groups with hydroxide ions as counterions, may take place as a result of the surface functionalization with functional groups $B_F$, thereby cleaving system component A.

During the chemical reaction, ions, for example hydroxide ions in an alkaline ester cleavage, may be irreversibly consumed, causing values of one or multiple physical variables which are measurable in reaction chamber 10, such as the pH, the electrical conductivity, the electrical resistance, etc., to change.

FIG. 1 illustrates that the sensor system also includes a measuring device 20 which is configured for determining a physical variable within reaction chamber 10, the value of which may be changed by the chemical reaction of system component A with detection component B.

A leak of system component A may thus be detected via a change in the value of the physical variable which is based in particular on the chemical reaction of system component A with detection component B.

In the specific embodiment illustrated in FIG. 1, the measuring device is configured for determining the electrical conductivity, the electrical resistance, the electrical voltage, the electrical current intensity, and/or the pH. The chemical reaction of functional groups $B_F$ of detection component B with system component A, for example in the form of an organic carbonate, takes place in a liquid environment F.

FIG. 1 illustrates that for this purpose, reaction chamber 10 also contains a liquid F which is applied in the form of a thin film to the surface of support structure $B_T$ of detection component B, wets same, and encloses functional groups $B_F$ of detection component B.

FIG. 1 illustrates that the sensor system includes electrical lines 11 which are partially enclosed by reaction chamber 10, and which in particular electrically connect thin liquid film F to measuring device 20.

Figure 2:
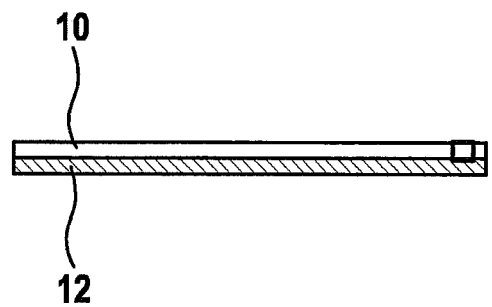
FIG. 2 shows a schematic cross section of the specific embodiment of the sensor system according to the present invention shown in FIG. 1, the rectangle representing the section of the reaction chamber illustrated in greatly enlarged form in FIG. 1.

FIG. 2 shows a schematic cross section of the specific embodiment of the sensor system according to the present invention shown in FIG. 1, the rectangle on the right side representing the section of reaction chamber 10 illustrated in greatly enlarged form in FIG. 1. FIG. 2 illustrates that the sensor system is based on a sensor element which includes a thin supporting body 12, for example a material such as a plastic film such as polyethylene and/or polypropylene, to which a layer is applied which contains detection component B and liquid F as shown in FIG. 1, and which is thus used as a reaction chamber 10. Support body 12 provided with the layer forming the reaction chamber 10 may in particular be configured as a test strip which may be installed at a suitable location in or on the storage system, a battery pack, for example.

Figure 3:
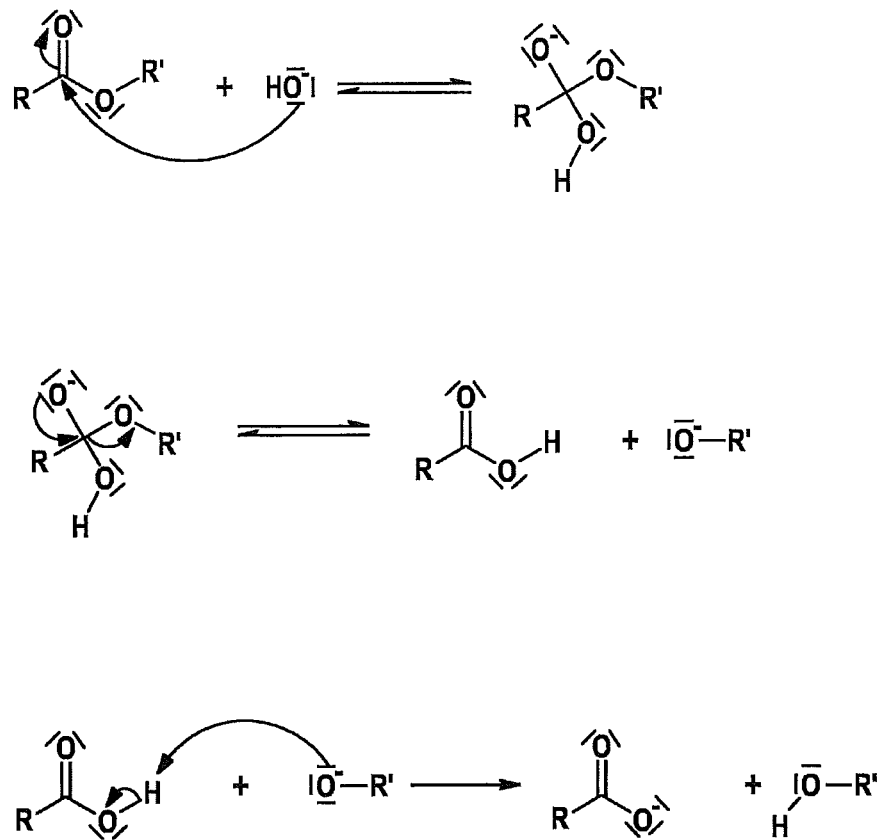
FIG. 3 shows reaction equations for illustrating an alkaline ester cleavage of a system component in the form of an ester by a detection component containing strongly basic functional groups.

FIG. 3 shows reaction equations for illustrating an alkaline ester cleavage of a system component A in the form of an ester, in particular an organic carbonate, by a detection component containing strongly basic functional groups, for example containing quaternary ammonium groups with hydroxide ions as counterions.

FIG. 3 illustrates that in the alkaline ester cleavage, initially a hydroxide ion may attack the sp2-hybridized carbon of the ester, forming an sp3-hybridized intermediate product. This intermediate product may rearrange, forming a carboxylic acid and an alcoholate. The alcoholate may then deprotonize the carboxylic acid, ultimately resulting in the formation of a carboxylate and an alcohol.

Hydroxide ions are irreversibly consumed during the alkaline ester cleavage, so that the pH of the reaction medium changes. In the event of a leak of an ester-containing electrolyte from an electrochemical storage system, for example a lithium-ion cell, the more electrolyte that leaks, the more hydroxide ions are consumed, and the greater is the change in the pH. An appropriate measurement of the change in pH thus allows a quantitative conclusion concerning the severity of the leak. An alternative to measuring the change in pH is the measurement of the change in conductivity of the reaction medium. The conductivity, via the ion mobility, is a function of the nature of the charge carriers (hydroxide ions→carboxylate), which change during the reaction. Based on a measurement of the change in conductivity, conclusions may likewise be drawn concerning the quantity of reacted ester, in particular organic carbonate, and thus, the severity of the leak.

What is claimed is:

1. A system, comprising:
   at least one of: a sensor system, or a sensor element;
   wherein the sensor system includes:
      a reaction chamber having a detection component, the detection component including at least one of: basic functional groups, or acidic functional groups; and
      a measuring device for determining a physical variable within the reaction chamber,
      wherein the value of the physical variable is changed by a chemical reaction of a gaseous system component of a battery with the detection component upon entry of the gaseous system component to the reaction chamber, the chemical reaction irreversibly consuming ions of the detection component, the chemical reaction including at least one of: an ester cleavage, or an ether cleavage; and
      wherein a leak of the gaseous system component from the battery is detectable via a change in the value of the physical variable, and
   wherein the sensor element includes:
      a support body,
      a layer which contains a detection component, the layer being applied to the support body, the detection component including at least one of: basic functional groups, or acidic functional groups; a value of a physical variable within the layer being changed by a chemical reaction of the gaseous system component of the battery with the detection component upon entry of the gaseous system component to the layer, the chemical reaction irreversibly consuming at least a portion of the detection component, the chemical reaction including at least one of: an ester cleavage, or an ether cleavage;
      wherein a leak of the gaseous system component from the battery is detectable by determining a change in the value of the physical variable within the layer.

2. The system of claim 1, further comprising the battery, which is a lithium-ion battery.

3. An electrochemical storage system, comprising:
   a battery;
   a sensor element for detecting a leak of a gaseous system component of the battery, the sensor element including:
      a support body; and
      a layer which contains a detection component, the layer being applied to the support body, the layer configured to receive the gaseous system component, a value of a physical variable within the layer being changed by a chemical reaction of the gaseous system component with the detection component upon entry of the gaseous system component to the layer, the chemical reaction irreversibly consuming ions of the detection component, the chemical reaction including at least one of: an ester cleavage, or an ether cleavage;
      wherein the leak of the gaseous system component is detectable by determining a change in the value of the physical variable within the layer.

4. The electrochemical storage system of claim 3, wherein the battery is a lithium-ion battery.

5. The electrochemical storage system of claim 3, wherein the sensor element has a strip-shaped configuration, which is attachable to the battery.

6. The electrochemical storage system of claim 3, wherein the sensor element has a strip-shaped configuration, which is a test strip, and which is attachable or adherable to the battery, which is a lithium-ion battery.

7. The electrochemical storage system of claim 3, wherein the layer is connectable to a measuring device via electrical lines.

8. The electrochemical storage system of claim 3, wherein the layer is connectable to a measuring device via electrical lines, and wherein the layer partially encloses the electrical lines.

9. The electrochemical storage system of claim 3, wherein the support body is a supporting film, wherein a liquid is applied to the support body, and wherein the change in the value of the physical variable within the layer is determined by a measuring device which is connectable to the sensor element.

10. An electrochemical storage system, comprising:
    a battery;
    a sensor system for detecting a leak of a gaseous system component of the battery, the sensor system including:
       a reaction chamber having a detection component and configured to receive the gaseous system component; and
       a measuring device for determining a physical variable within the reaction chamber;
       wherein the value of the physical variable is changed by a chemical reaction of the gaseous system component with the detection component upon entry of the gaseous system component to the reaction chamber, the chemical reaction irreversibly consuming ions of the detection component, the chemical reaction including at least one of: an ester cleavage, or an ether cleavage; and
       wherein the leak of the gaseous system component is detectable via a change in the value of the physical variable.

11. The electrochemical storage system of claim 10, wherein the battery is a lithium-ion battery.

12. The electrochemical storage system of claim 10, wherein the physical variable includes an electrical resistance.

13. The electrochemical storage system of claim 10, wherein the physical variable includes an electrical voltage.

14. The electrochemical storage system of claim 10, wherein the physical variable includes a pH.

15. The electrochemical storage system of claim 10, wherein a leak rate of the system component is determinable based on the change in the value of the physical variable.

16. The electrochemical storage system of claim 10, wherein a leak quantity of the system component is determinable based on the change in the value of the physical variable.

17. The electrochemical storage system of claim 10, wherein the physical variable includes at least one of: electrical conductivity, electrical resistance, electrical voltage, electrical current intensity, pH, wavelength, transmission, or absorption.

18. The electrochemical storage system of claim 10, wherein at least one of a leak quantity and a leak rate of the system component is determinable based on the change in the value of the physical variable, and wherein the determination of the at least one of the leak quantity and the leak rate of the system component is based on at least one of an absolute value and a slope of the change in the value of the physical variable.

19. The electrochemical storage system of claim 10, wherein the reaction chamber also contains a liquid.

20. The electrochemical storage system of claim 10, wherein the reaction chamber also contains a liquid, and wherein the liquid at least one of wets and encloses the detection component.

21. The electrochemical storage system of claim 10, wherein the reaction chamber contains a liquid contacting the detection component, and electrical lines electrically connect the liquid to the measuring device.

22. The electrochemical storage system of claim 10, wherein:
the reaction chamber contains at least one of: a liquid, or a film;
the at least one of the liquid or film at least one of: wets the detection component, or encloses functional groups of the detection component.

23. The electrochemical storage system of claim 10, wherein the chemical reaction irreversibly consumes hydroxide ions of the detection component.

24. The electrochemical storage system of claim 10, wherein the chemical reaction is the ester cleavage, which is an alkaline ester cleavage.

25. The electrochemical storage system of claim 10, wherein the system component is an integral electrolyte component and/or an acyclic or cyclic ether.

26. The electrochemical storage system of claim 10, wherein the system component is an integral electrolyte component and/or an acyclic or cyclic ether, and wherein the system component is an acyclic or cyclic ester, which is an acyclic or cyclic organic carbonate.

27. The electrochemical storage system of claim 10, wherein the sensor system includes a support body, and a layer which contains the detection component.

28. The electrochemical storage system of claim 10, wherein the sensor system includes a support body, which is a supporting film, a layer which contains the detection component, and a liquid applied to the support body.

29. The electrochemical storage system of claim 10, wherein the detection component contains basic functional groups or acidic functional group.

30. The electrochemical storage system of claim 10, wherein the detection component includes a support structure.

31. The electrochemical storage system of claim 30, wherein at least one of the detection component and the support structure of the detection component is porous.

32. The electrochemical storage system of claim 10, wherein the detection component contains basic functional groups or acidic functional groups, and wherein the detection component contains quaternary ammonium groups with hydroxide ions as counterions.

33. The electrochemical storage system of claim 32, wherein the detection component includes a support structure, wherein the basic functional groups or acidic functional groups are bound to a surface of the support structure, and wherein the support structure is made of a material which includes at least one of: zeolites, aluminum oxides, silica gels, synthetic resins, or polysaccharides.

* * * * *